US010180576B2

United States Patent
Totani et al.

(10) Patent No.: US 10,180,576 B2
(45) Date of Patent: *Jan. 15, 2019

(54) VIRTUAL IMAGE DISPLAY DEVICE

(71) Applicant: SEIKO EPSON CORPORATION, Tokyo (JP)

(72) Inventors: Takahiro Totani, Suwa (JP); Masayuki Takagi, Shiojiri (JP); Toshiaki Miyao, Matsumoto (JP); Akira Komatsu, Kamiina-gun (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/636,820

(22) Filed: Jun. 29, 2017

(65) Prior Publication Data
US 2017/0299871 A1    Oct. 19, 2017

Related U.S. Application Data

(60) Continuation of application No. 15/190,521, filed on Jun. 23, 2016, now Pat. No. 9,720,239, which is a
(Continued)

(30) Foreign Application Priority Data

Feb. 4, 2011   (JP) ................................. 2011-022443

(51) Int. Cl.
*G02B 27/14* (2006.01)
*G09G 5/00* (2006.01)
(Continued)

(52) U.S. Cl.
CPC ....... *G02B 27/0172* (2013.01); *G02B 6/0045* (2013.01); *H04N 13/111* (2018.05);
(Continued)

(58) Field of Classification Search
CPC .. G02B 27/01; G02B 27/0101; G02B 27/017; G02B 27/0172; G02B 2027/0178
(Continued)

(56) References Cited

U.S. PATENT DOCUMENTS 6,124,977 A    9/2000  Takahashi
6,219,188 B1   4/2001  Tsukamoto
(Continued)

FOREIGN PATENT DOCUMENTS

CN    101661163 A    3/2010
JP    H07-234301 A   9/1995
(Continued)

OTHER PUBLICATIONS

Jan. 29, 2013 Office Action issued in U.S. Appl. No. 13/357,205.
(Continued)

*Primary Examiner* — William Choi
(74) *Attorney, Agent, or Firm* — Oliff PLC

(57) ABSTRACT

A half mirror layer has an angle dependency in which when an angle of incidence becomes larger than the angle of incidence range of image light, reflectance increases, such that it is possible to prevent unintended light, which is emitted to a light transmitting member from a light guiding member and is reflected inside a light transmitting member, from being returned to a Eight emission portion of the light guiding member after passing through the half mirror layer as a reflective film at a relatively large angle of incidence. Therefore, it is possible to prevent the image light passed through the light transmitting member from becoming ghost light while mitigating the demand for increasing processing accuracy of the light transmitting member, and bonding accuracy between the light guiding member and the light transmitting member, to provide a high quality virtual image displayed by a virtual image display device.

18 Claims, 10 Drawing Sheets

Related U.S. Application Data division of application No. 13/968,912, filed on Aug. 16, 2013, now Pat. No. 9,400,389, which is a division of application No. 13/361,249, filed on Jan. 30, 2012, now Pat. No. 8,587,869.

(51) Int. Cl.

| | | |
|---|---|---|
| *G02B 27/01* | (2006.01) | |
| *H04N 13/111* | (2018.01) | |
| *H04N 13/332* | (2018.01) | |
| *H04N 13/344* | (2018.01) | |
| *F21V 8/00* | (2006.01) | |
| *G02B 6/00* | (2006.01) | |

(52) U.S. Cl.
CPC ......... *H04N 13/332* (2018.05); *H04N 13/344* (2018.05); *G02B 6/00* (2013.01); *G02B 2027/0112* (2013.01); *G02B 2027/0118* (2013.01); *G02B 2027/0123* (2013.01); *G02B 2027/0125* (2013.01); *G02B 2027/0178* (2013.01)

(58) Field of Classification Search
USPC ...................................... 359/629, 630; 345/7
See application file for complete search history.

(56) References Cited

U.S. PATENT DOCUMENTS

| | | | |
|---|---|---|---|
| 7,944,616 B2 | 5/2011 | Mukawa | |
| 8,052,308 B2 | 11/2011 | Kamijima | |
| 9,400,389 B2* | 7/2016 | Totani ................ | G02B 27/0172 |
| 9,720,239 B2* | 8/2017 | Totani ................ | G02B 27/0172 |
| 2001/0010598 A1 | 8/2001 | Aritake et al. | |
| 2003/0034935 A1 | 2/2003 | Amanai et al. | |
| 2004/0085649 A1 | 5/2004 | Repetto et al. | |
| 2004/0109208 A1 | 6/2004 | Amanai et al. | |
| 2005/0174651 A1 | 8/2005 | Spitzer et al. | |
| 2006/0087755 A1 | 4/2006 | Richard | |
| 2007/0047091 A1 | 3/2007 | Spitzer et al. | |
| 2007/0058261 A1 | 3/2007 | Sugihara et al. | |
| 2007/0091445 A1 | 4/2007 | Amitai | |
| 2008/0198097 A1 | 8/2008 | Ishino et al. | |
| 2008/0239422 A1 | 10/2008 | Noda | |
| 2010/0103078 A1 | 4/2010 | Mukawa et al. | |
| 2010/0245211 A1 | 9/2010 | Iba et al. | |
| 2011/0181960 A1 | 7/2011 | Tanijiri | |
| 2011/0310491 A1 | 12/2011 | Takagi et al. | |
| 2012/0200935 A1 | 8/2012 | Miyao et al. | |
| 2012/0200936 A1 | 8/2012 | Takagi et al. | |
| 2012/0200938 A1 | 8/2012 | Totani et al. | |
| 2012/0206817 A1 | 8/2012 | Totani et al. | |
| 2013/0069850 A1 | 3/2013 | Mukawa et al. | |

FOREIGN PATENT DOCUMENTS

| | | |
|---|---|---|
| JP | H11-142783 A | 5/1999 |
| JP | H11-249067 A | 9/1999 |
| JP | 2002-318366 A | 10/2002 |
| JP | 2004-157520 A | 6/2004 |
| JP | 2006-003879 A | 1/2006 |
| JP | 2007-010830 A | 1/2007 |
| JP | 2007-505352 A | 3/2007 |
| JP | 2007-129550 A | 5/2007 |
| JP | 2007-171514 A | 7/2007 |
| JP | 2008-052096 A | 3/2008 |
| JP | 2008-122511 A | 5/2008 |
| JP | 2008-165016 A | 7/2008 |
| JP | 2008-535001 A | 8/2008 |
| JP | 2008-249869 A | 10/2008 |
| JP | 2008-268873 A | 11/2008 |
| JP | 2010-102077 A | 5/2010 |
| JP | 2010-224473 A | 10/2010 |
| JP | 2010-230716 A | 10/2010 |
| JP | 2010-276914 A | 12/2010 |
| WO | 2005/024491 A1 | 3/2005 |
| WO | 2005/024969 A2 | 3/2005 |
| WO | 2010/041578 A1 | 4/2010 |

OTHER PUBLICATIONS

Jan. 30, 2013 Office Action issued in U.S. Appl. No. 13/363,732.
Jun. 20, 2013 Office Action issued in U.S. Appl. No. 13/353,641.
Jul. 23, 2013 Office Action issued in U.S. Appl. No. 13/355,893.
Nov. 12, 2014 Office Action issued in U.S. Appl. No. 13/353,641.
U.S. Appl. No. 13/353,641, filed Jan. 19, 2012 in the name of Miyao.
Oct. 13, 2015 Office Action issued in U.S. Appl. No. 13/968,912.
Mar. 24, 2016 Notice of Allowance issued in U.S. Appl. No. 13/968,912.

* cited by examiner

VIRTUAL IMAGE DISPLAY DEVICE

This is a continuation application of application Ser. No. 15/190,521 filed Jun. 23, 2016, which in turn is a divisional application of application Ser. No. 13/968,912 filed Aug. 16, 2013, which in turn is a divisional application of application Ser. No. 13/361,249 filed Jan. 30, 2012, which claims priority to JP 2011-022443 filed in Japan on Feb. 4, 2011. The disclosure of the prior applications is hereby incorporated by reference herein in its entirety.

BACKGROUND

1. Technical Field

The present invention relates to a virtual image display device such as a head-mounted display that is used by being mounted on the head.

2. Related Art

In recent years, as a virtual image display device that allows a virtual image to be formed and to be observed similarly to the head-mounted display, various virtual image display devices of a type in which image light from a display element is guided to a pupil of an observer by a light guiding plate have been suggested.

In this virtual image display device, the image light and external light overlap with each other, such that a see-through optical system has been suggested (refer to JP-A-2006-3879 and JP-A-2010-224473).

However, in the device disclosed in JP-A-2006-3879 or the like, the see-through is realized by a pupil division method that uses a light guiding optical system in which an emission opening is smaller than a pupil size, such that it is difficult to make a display size of the virtual image large. In addition, the light guiding optical system that is smaller than the size of the pupil is used, such that it is difficult to make an effective pupil diameter (a lighting diameter that allows the virtual image to be taken in, and is called an Eyring diameter) large so as to correspond to an individual pupil width in human beings. In addition, the emission opening or a casing of the light guiding optical system is physically disposed in the vicinity of the pupil, such that a blind spot is generated, and therefore it is not necessarily a perfect see-through.

In addition, as an optical system for the head-mounted display, an optical system including a light guiding pipe that allows a plurality of light modes in which the light guiding angles are different from each other to progress (refer to JP-A-2008-535001) is disclosed. In this optical system, it may be considered that a third optical surface at an emission side is set as a half mirror, and light that is transmitted through the third optical surface is made to go straight to realize a see-through type display device.

However, in the optical system disclosed in JP-A-2008-535001, a liquid crystal panel is illuminated with collimated light in which a different angle of incidence is set for each of the optical modes on the assumption that a phase of each of the plurality of optical modes is misaligned. In addition, display content is changed by each optical mode, and a display of each optical mode is sequentially performed, and thereby an image of each optical mode is connected to obtain an entire image. In this case, a center image and left and right images, which make up the entire image, are necessary to be displayed while these are changed at a time difference by one liquid crystal panel, such that a virtual image display device becomes complex and an observed image becomes dark.

Separately from this configuration, it may be considered that a virtual image display device that allows a virtual image to be observed in an overlapped manner with external light by a light guiding member provided with a light emitting portion to cover the front of an eye, in which it is not necessary to connect an image at a time difference. However, it is difficult to display a large image, and in a case where a member such as a see-through prism is connected to the light guiding member, ghost light is generated due to this member and therefore the ghost light easily reaches an eye.

SUMMARY

An advantage of some aspects of the invention is to provide a virtual image display device that enables a see-through observation and can display a virtual image of a high quality by suppressing observation of ghost light.

An aspect of the invention is directed to a virtual image display device including (a) a light guiding member that includes a light guiding portion, a light incidence portion that allows image light to be incident to the light guiding portion, and a light emission portion that emits the image light guided by the light guiding portion to the outside, and that makes the image light visible through the light emission portion; and (b) a light transmitting member that makes up a see-through portion that allows external light to be observed through a combination with the light guiding member, in which (c) a reflective film having a light transmitting property and an angle dependency in which when an angle of incidence becomes larger than the angle of incidence range of the image light, reflectance increases is provided between the light emission portion and the light transmitting member.

According to this virtual image display device, the reflective film provided between the light emission portion and the light transmitting member has an angle dependency in which when the angle of incidence becomes larger than the angle of incidence range of the image light, the reflectance increases, such that it is possible to prevent unintended light, which is emitted to the light transmitting member from the light guiding member and is reflected inside the light transmitting member, from being returned to the light emission portion of the light guiding member after passing through the reflective film at a relatively large angle of incidence. Therefore, it is possible to prevent the image light passed through the light transmitting, member from becoming ghost light, and thereby it is possible to make a virtual image displayed by the virtual image display device have a high quality.

In a specific aspect of the invention, the virtual image display device may be configured such that the reflective film has a characteristic in which the reflectance varies in a stepwise fashion with a predetermined lower limit angle given as a boundary, and reflects light having an angle of incidence larger than the lower limit angle and uniformly transmits light having an angle of incidence smaller than the lower limit angle. In this case, it is possible to reliably see through external light in which an angle of incidence is smaller than the lower limit angle, and thereby it is possible to reliably exclude unnecessary light that is incident to the reflective film from a rear side at an angle larger than the lower limit angle.

In another aspect of the invention, the virtual image display device may be configured such that the reflective film is formed by laminating plural kinds of films. Therefore, it is easy to have a desired angle dependency that is difficult to be realized in a single layer, with respect to the reflectance of a reflective film.

In still another aspect of the invention, the virtual image display device may be configured such that the reflective film has a structure in which a metallic reflective film and a dielectric multi-layer film are laminated. In this case, it is possible to suitably block the ghost light in which the angle of incidence is relatively large while preventing disturbance or useless attenuation in image light to be reflected.

In yet another aspect of the invention, the virtual image display device may be configured such that the reflective film includes a semi-transmissive reflective film. including an Ag film whose transmittance is adjusted as the metallic reflective film. The Ag film serves as a half mirror in which absorption is small and efficiency is high. In addition, in the Ag film, sensitivity in the transmittance with respect to increase or decrease in a film thickness is lower than a case of Al film or the like, and it is easy to perform an adjustment of the reflectance or the transmittance.

In still yet another aspect of the invention, the virtual image display device may be configured such that the reflectance of the reflective film is 10% to 50% with respect to the image light. In this case, it becomes easy to observe external light, that is, an external image via a see-through.

In further another aspect of the invention, the virtual image display device may be configured such that the light guiding portion has a first reflective surface and a second reflective surface that are disposed in parallel with each other and allow light to be guided through a total reflection, the light incidence portion has a third reflective surface that makes a predetermined angle with respect to the first reflective surface, the light emission portion has a fourth reflective surface that makes a predetermined angle with respect to the first reflective surface, the light transmitting member has a wedge-shaped member having a light transmitting surface bonded to the fourth reflective surface of the light emission portion through the reflective film, and the reflective film is disposed between the fourth reflective surface and the light transmitting surface. According to this virtual image display device, image light reflected by the third reflective surface of the light incidence portion is propagated while being totally reflected by the first and second reflective surfaces of the light guiding portion, is reflected by the fourth reflective surface of the light emission portion, and is incident to observer's eye as a virtual image. In this case, it is possible to form the light guiding member as a member having an external form of a polygonal block shape, such that it is easy to assemble the light guiding member into the virtual image display device, and the virtual image may be observed with high accuracy. In addition, in a see-through observation over the half mirror of the fourth reflective surface, distortion may be small due to the light transmitting portion.

In still further another aspect of the invention, the virtual image display device may be configured such that the light guiding portion has an end surface that blocks the ghost light at a position at least one of portions between the first reflective surface and the fourth reflective surface, and between the first reflective surface and the third reflective surface. Therefore, it is possible to further suppress the ghost light.

In yet further another aspect of the invention, the virtual image display device may be configured such that the light transmitting member has a first surface and a second surface that are disposed in parallel with the first reflective surface and the second reflective surface, respectively. Therefore, in the see-through observation via the light transmitting member, distortion does not occur and flatness becomes high.

In still yet further another aspect of the invention, the virtual image display device may be configured to further include an image display device that forms image light, and a projective optical system that makes the image light emitted from the image display device be incident. The number of times of reflection of first image light, which is emitted from a first partial region in the image display device, in the light guiding portion, and the number of times of reflection of second image light, which is emitted from a second partial region different from the first partial region in regard to a confinement direction in which a return of the optical path due to reflection occurs at the time of light-guiding, in the light guiding portion may be different from each other. In this case, image light beams in which the number of times of reflection is different are used, such that it is possible to make an angle of emission of the image light emitted from the light emission portion have a wide angle width. That is, it is possible to take in image light from a different display position in an image display device at a relatively wide viewing angle, such that it is possible to secure a large display size in a virtual image that is observed over the light emission portion. In this way, it is configured to have a structure in which image light beams in which the number of times of reflection is different are taken out, such that it is possible to make the light emission portion large so as to cover a pupil without making the light guiding portion too much thicker, and thereby preferable see-through Observation may be realized.

In a further aspect of the invention, the virtual image display device may be configured such that the confinement direction is a direction that is parallel with a cross-section including a first optical axis in which the first image light and the second image light pass through the projective optical system and a normal line of the third reflective surface the image light beams from different positions in relation to the cross-sectional direction, angles of emission, that is, angles of incidence to the light incidence portion are made to be different from each other, such that it is possible to make the number of times of reflection inside the light guiding portion different.

In a still further aspect of the invention, the virtual image display device may be configured such that each of the light guiding member and the light transmitting member is integrally molded independently through an injection molding. In this case, it is possible to produce the light guiding member and the light transmitting member with high accuracy using an injection molding technique.

In a yet further aspect of the invention, the virtual image display device may be configured such that the light guiding member and the light transmitting member are molded from a thermal polymerization type resin material, respectively. In this case, it is possible to increase weight reduction or safety due to the resin, and thereby a stable and highly accurate molding due to thermosetting may be realized.

A still yet further aspect of the invention is directed to a virtual image display device including a light guiding member that includes a light guiding portion, a light incidence portion that allows image light to be incident to the light guiding portion, and a light emission portion that emits lie image light guided by the light guiding portion to the outside, and that makes the image light visible through the light emission portion; and a light transmitting member that makes up a see-through portion that allows external light to be observed through a combination with the light guiding member, in which a semi-transmissive reflective surface, which prevents light incident to the light transmitting member from the light emission portion of the light guiding member from being incident again to the light guiding member side, is provided.

According to this virtual image display device, the semi-transmissive reflective surface prevents light incident to the light transmitting member from the light emission portion of the light guiding member from being incident again to the light guiding member side, such that it is possible to prevent the image light passed through the light transmitting member from becoming ghost light, and thereby it is possible to make the virtual image displayed by the virtual image display device have a high quality.

BRIEF DESCRIPTION OF THE DRAWINGS

The invention will be described with reference to the accompanying drawings, wherein like numbers reference like elements.

FIG. 12 is a diagram illustrating a modification of the light guiding member shown in FIG. 2A or the like.

DETAILED DESCRIPTION OF EMBODIMENTS

Hereinafter, a virtual image display device related to one embodiment of the invention will be described in detail with reference to the accompanying drawings.

A. External Appearance of Virtual Image Display Device

Figure 1:
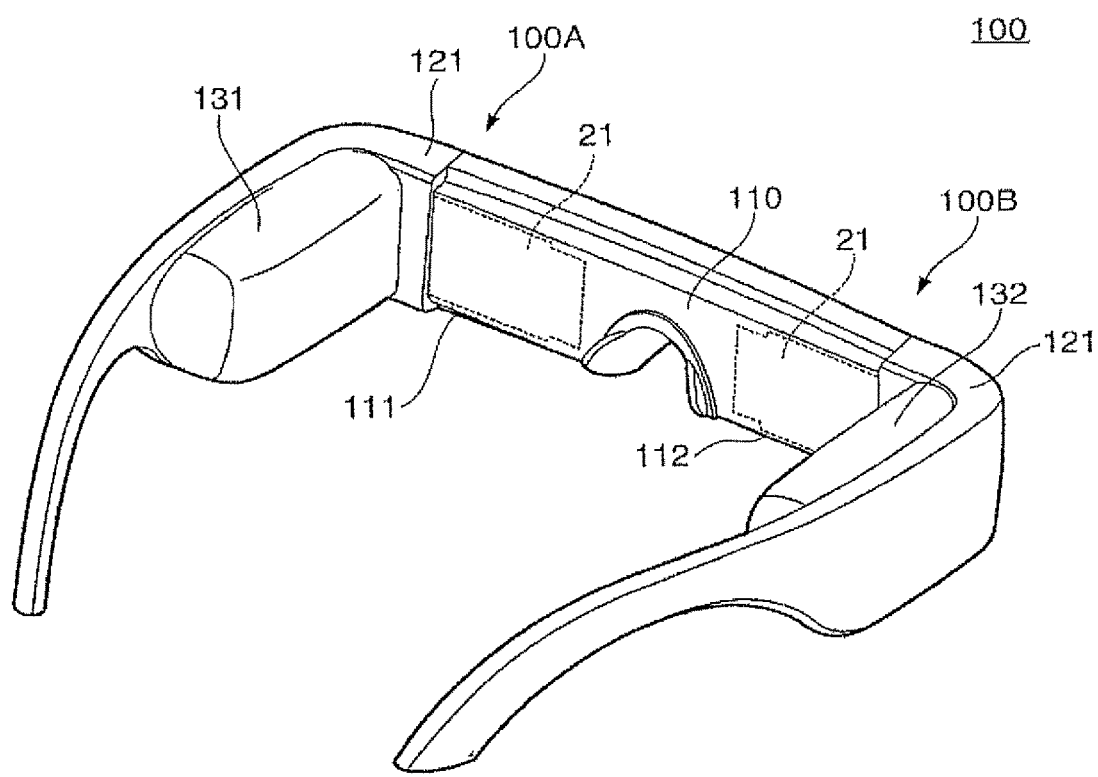
FIG. 1 is a perspective view illustrating a virtual image display device of an embodiment.

A virtual image display device 100 of an embodiment illustrated in FIG. 1 is a head-mounted display having the same external appearance as eyeglasses, and allows an observer wearing this virtual image display device 100 to perceive image light via a virtual image and allows the observer to observe an external image via a see-through. The virtual image display device 100 includes an optical panel 110 that covers the front of the observer's eyes, a frame 121 that maintains the optical panel 110, and first and second driving portions 131 and 132 that are provided at a portion ranging from arm to temple of the frame 121. Here the optical panel 110 includes a first panel portion 111 and a second panel portion 112, and the both panel portions 111 and 112 are formed of a plate-shaped part and are integrally connected at the center of the optical panel 110. A first display device 100A including the first panel portion 111 and the first driving portion 131 at the left-side in the drawing is a portion that forms a left-eye virtual image, and also functions independently as a virtual image display device. In addition, a second display device 100B including the second panel portion 112 and the second driving portion 132 at the right-side in the drawing is a portion that forms a right-eye virtual image, and also functions independently as a virtual image display device.

B. Structure of Display Device

Figure 2A:
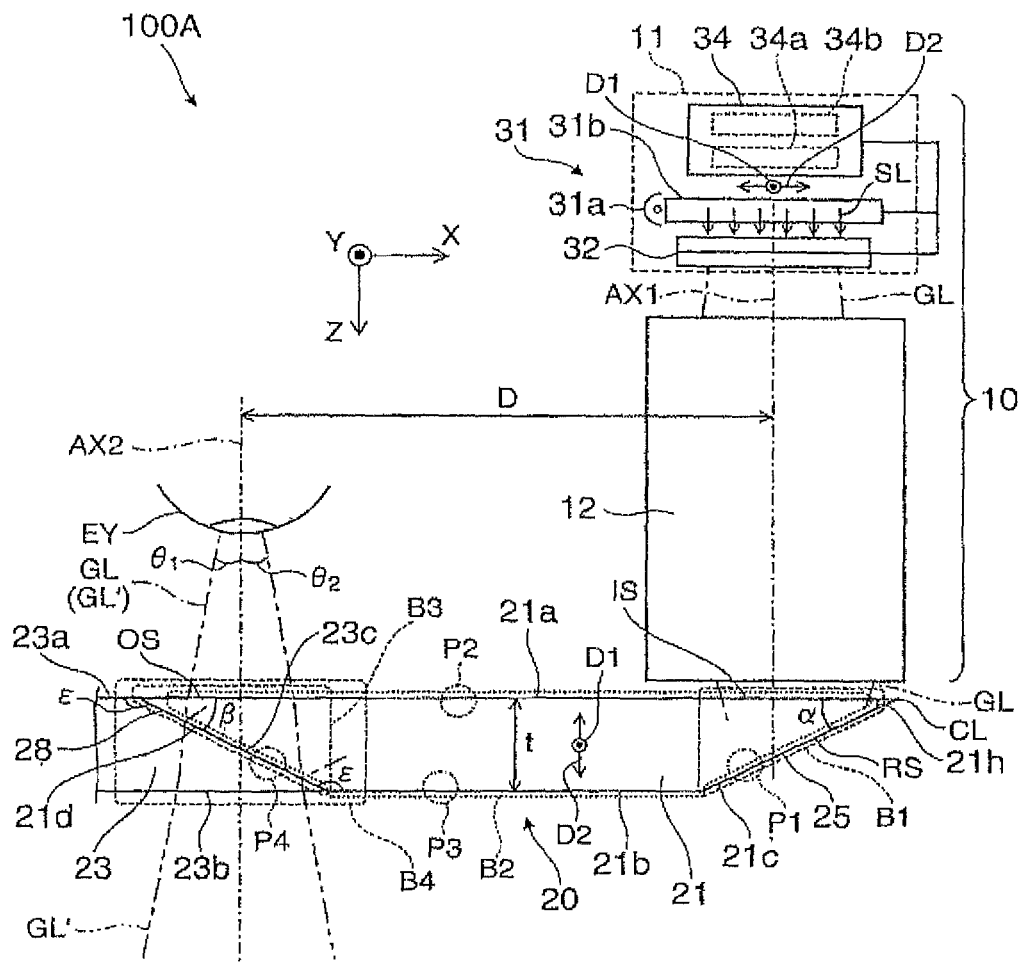
FIG. 2A is a plan view of a main body portion of a first display device making up the virtual image display device.

As shown in FIG. 2A or the like, the first display device 100A includes an image forming device 10 and a light guiding device 20. Here, the image forming device 10 corresponds to the first driving portion 131 in FIG. 1, and the light guiding device 20 corresponds to the first panel portion 111 in FIG. 1. In addition, the second display device 100B shown in FIG. 1 has the same structure as the first display device 100A except that the left and right are reversed, such that the detailed description of the second display device 100B will not be repeated.

The image forming device 10 includes an image display device 11 and a projective optical system 12. The image display device 11 includes an illumination device 31 that emits two-dimensional illumination light SL, a liquid crystal display device 32 that is a transmission-type spatial optical modulation device, and a driving control unit 34 that controls an operation of the illumination device 31 and the liquid crystal display device 32.

The illumination device 31 includes a light source 31a that generates light including three colors of red, green, and blue, and a backlight light-guiding portion 31b that diffuses the light from the light source 31a and converts this light into a light beam having a rectangular cross-section. The liquid crystal display device 32 spatially modulates illumination light SL emitted from the illumination device 31 and forms image light, which is an object to be displayed, such as a moving picture. The driving control unit 34 includes a light source driving circuit 34a and a liquid crystal driving circuit 34b. The light source driving circuit 34a supplies a power to the light source 31a of the illumination device 31 and allows the illumination light SL with a stable brightness to be emitted. The liquid crystal driving circuit 34b outputs an image signal or a driving signal to the liquid crystal display device 32, and forms colored-image light that becomes an origin of the moving picture or a still image as a transmittance pattern. In addition, the liquid crystal. driving circuit 34b may be provided with an image processing function, but the image processing function may be provided to a control circuit that is externally provided. The projective optical system 12 is a collimated lens that converts image light emitted from each point on the liquid crystal display device 32 into a parallel light beam.

In the liquid crystal display device 32, a first direction Di corresponds to an extension direction of a vertical cross-section including a first optical axis AX1 passing through the projective optical system 12 and a specific line parallel with a third reflective surface 21c of the light guiding member 21, which is described later, and a second direction D2 corresponds to an extension direction of a horizontal cross-section including the first optical axis AX1 and a normal line of the third reflective surface 21c. In other words, the first direction D1 is a direction parallel with an intersection line CL between a first reflective surface 21a of the light guiding member 21, which is described later, and the third reflective surface 21c, and the second direction D2 is a direction parallel with a plane of the first reflective surface 21a and is orthogonal to the intersection line CL between the first reflective surface 21a and the third reflective surface 21c. That is, in regard to a position of the liquid crystal display device 32, the first direction DI corresponds to a vertical Y-direction and the second direction D2 corresponds to a horizontal X-direction.

In addition, in regard to an effective size, the liquid crystal display device 32 has a horizontally long shape, that is, a length in the second direction D2 is larger than a length in the first direction D1. On the other hand, an emission opening of the projective optical system 12 has a vertically long shape, that is, a width in the first direction D1 is larger than a width in the second direction D2.

The light guiding device 20 is formed by bonding the light guiding member 21 and a light transmitting member 23, and makes up an optical member having a flat plate shape that extends in parallel with an XY plane, as a whole.

In the light guiding device 20, the light guiding member 21 is a trapezoidal prism-shaped member in a plan view, has a first reflective surface 21a, a second reflective surface 21b, a third reflective surface 21c, and a fourth reflective surface 21d as a side surface. In addition, the light guiding member 21 has a top surface 21e and a bottom surface 21f that are adjacent to the first, second, third, and fourth reflective surfaces 21a, 21b, 21c, and 21d, and are opposite to each other. Here, the first and second reflective surfaces 21a and 21b extend along the XY plane and are separated from each other by a thickness t of the light guiding member 21. In addition, the third reflective surface 21c is inclined at an acute angle α of 45° or less with respect to the XY plane, and the fourth reflective surface 21d is inclined, for example, at an acute angle β of 45° or less with respect to the XY plane. The first optical axis AX1 passing through the third reflective surface 21c and a second optical axis AX2 passing through the fourth reflective surface 21d are disposed in parallel with each other and are separated from each other by a distance D. In addition, as will be described later in detail, a corner is removed and thereby an end surface 21h is formed between the first reflective surface 21a and the third reflective surface 21c, When including this end surface 21h, the light guiding member 21 has an external form of a polyhedral shape with seven faces.

The light guiding member 21 performs the light guiding using a total reflection by the first and second reflective surfaces 21a and 21b. There are two directions, that is, a direction that is turned back by the reflection at the time of light-guiding, and a direction that is not turned back by the reflection at the time of light-guiding. When it is considered in relation to an image guided by the light guiding member 21, a horizontal direction that is turned-back by plural times of reflection at the time of light-guiding, that is, a confinement direction corresponds to the second direction D2 of the liquid crystal display device 32 when an optical path is developed to the light source side in vertical to the first and second reflective surfaces 21a and 21b (in parallel with the Z-axis) as described later, a vertical direction that is not turned-back by the reflection at the time of light-guiding, that is, a free propagation direction corresponds to the first direction D1 of the liquid crystal display device 32 when an optical path is developed to the light source side in parallel with the first and second reflective surfaces 21a and 21b, and the third reflective surface 21c (in parallel with the Y-axis) as described later.

The light guiding member 21 is formed of a resin material showing a high light transmitting property at a visible range. The light guiding member 21 is a member of a block state, which is integrally molded by an injection molding, and is formed, for example, by injecting a thermal polymerization-type resin material into a metal mold and by thermally curing this molded resin material. In this way, the light guiding member 21 is an integrally formed product, but functionally, may be considered as being classified into a light incidence portion B1, a light guiding portion B2, and a light emission portion B3.

The light incidence portion B1 is a triangular prism-shaped portion and has a light incidence surface IS that is a part of the first reflective surface 21a, and the third reflective surface 21c opposite to the light incidence surface IS. The light incidence surface IS is a rear-side or observer-side plane for taking in image light GL from the image forming device 10, and extends in a direction orthogonal to the first optical axis AX1 and opposite to the projective optical system 12. The third reflective surface 21c is a rectangular total reflection mirror that reflects the image light GL passed through the light incidence surface IS and guides this reflected image light GL into the light guiding portion B2.

Figure 3A:
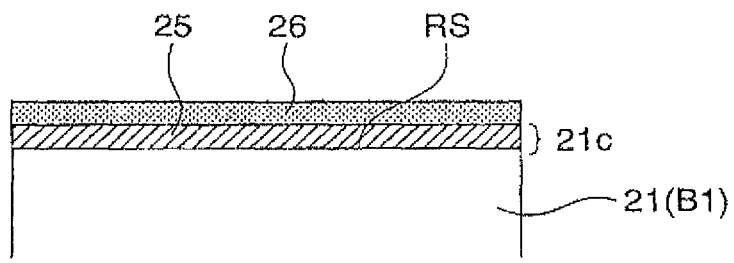
FIG. 3A is a diagram illustrating a structure of a third reflective surface in a light incidence portion of a light guiding member.

FIG. 3A is a diagram illustrating the third reflective surface 21c, and is a partially enlarged cross-sectional view of a surface portion P1 in the light incidence portion B1. The third reflective surface 21c has a mirror layer 25 and is coated with a protective layer 26. This mirror layer 25 is a total reflection coating and is formed by forming a film through a vapor deposition of aluminum or the like on an inclined surface RS of the light guiding member 21. The third reflective surface 21c is inclined with respect to the first optical axis AX1 of the projective optical system 12 or the XY plane, for example, at an acute angle α of 25° to 27°, and turns-back the image light GL that is incident from the light incidence surface IS and faces a positive Z-direction as a whole, in order for the image light GL to face a negative X-direction close to a negative Z-direction as a whole, such that the image light GL may be reliably guided into the light guiding portion B2.

Returning to FIG. 2A, the light guiding portion B2 has the first reflective surface 21a and the second reflective surface 21b, which totally reflect the image light turned-back by the light incidence portion B1, as two planes that extend in parallel with the XY plane and opposite to each other. A distance between the first and second reflective surfaces 21a and 21b, that is, a thickness t of the light guiding member 21 is set to, for example, substantially 9 mm. Here, it is assumed that the first reflective surface 21a is at a rear side or observer side that is close to the image forming device 10, and the second reflective surface 21b is at a front side or external side that is distant from the image forming device 10. In this case, the first reflective surface 21*a* is a plane portion that is common to the light incidence surface IS described above or a light emission surface OS described later. The first and second reflective surfaces 21*a* and 21*b* are total reflection surfaces using a difference in refraction indexes, and to which a reflective coat such as a mirror layer is not provided.

Figure 3B:
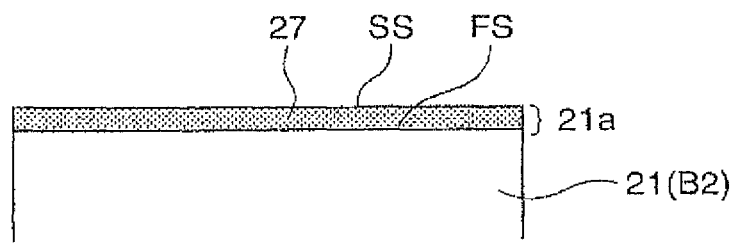
FIG. 3B is a diagram illustrating a structure of a first reflective surface in a light guiding portion of the light guiding member.
Figure 3C:
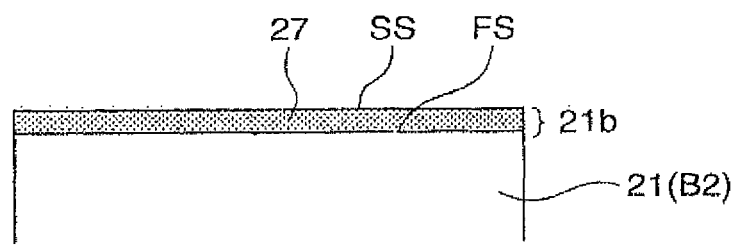
FIG. 3C is a diagram illustrating a structure of a second reflective surface in the light guiding portion of the light guiding member.

FIG. 3B is a diagram illustrating the first reflective suffice 21*a*, and is a partially enlarged cross-sectional view of a surface portion P1 in the light guiding portion B2 of the light guiding member 21. In addition, FIG. 3C is a diagram illustrating the first reflective surface 21*a*, and is a partially enlarged cross-sectional view of the surface portion P1 in the light guiding portion 132 of the light guiding member 21. The first and second reflective surfaces 21*a* and 21*b* are coated with a hard coat layer 27 to prevent damage to a surface and thereby to prevent deterioration in the resolution of a video, This hard coat layer 27 is formed by forming a film through a dipping process or a spray coating process of an UV-curable resin, a thermosetting resin, or the like on a flat surface FS of the light guiding member 21. The image light GL reflected by the third reflective surface 21*c* of the light incidence portion B1 is, first, incident to the first reflective surface 211*a* and is totally reflected. Next, the image light GL is incident to the second reflective surface 21*b* and is totally reflected. Hereinafter, these operations are repeated, and thereby the image light is guided to an internal side of the light guiding device 20, that is, a negative X side in which the light emission portion B3 is provided. In addition, a reflective coat is not provided to the first and second reflective surfaces 21*a* and 21*b*, such that external light that is incident to the second reflective surface 21*b* from the external side passes through the light guiding portion B2 with a high transmittance. That is, the light guiding portion B2 is formed of a see-through type in which the see-through of an external image is possible.

The above-described total reflection at the first and second reflective surfaces 21*a* and 21*b* may be made to occur at an inner side of a surface SS of the hard coat layer 27 through a setting of a refractive index of the hard coat layer 27, but may be made to occur at an inner side of the flat surface FS.

Returning to FIG. 2A or the like, the light emission portion B3 is a triangular prism-shaped portion, and has a light emission surface OS that is a part of the first reflective surface 21*a* and the fourth reflective surface 21*d* that is opposite to the light emission surface OS. The light emission surface OS is a rear-side pane that emits the image light GL to the observer's eye EY, and is formed of a part of the first reflective surface 21*a* similarly to the light incidence surface IS, and extends in a direction orthogonal to the second optical axis AX2. A distance D between the second optical axis AX2 passing through the light emission portion B3 and the first optical axis AX1 passing through the light incidence portion B1 is set to, for example, 50 mm in consideration of the width of the observer's head, or the like. The fourth reflective surface 21*d* is a rectangular flat surface that reflects the image light GL, which is incident through the first and second reflective surfaces 21*a* and 21*b*, and emits this image light GL to the outside of the light emission portion B3. A half mirror layer 28 is provided to be attached to the fourth reflective surface 21*d*. This half mirror layer 28 is a reflective film haying a light transmitting property (that is, a semi-transmissive reflective film), and a surface thereof serves as a semi-transmissive reflective surface. The half mirror layer (light-transmitting reflective film or semi-transmissive reflective film) 28 is formed by forming a metallic reflective film or a dielectric multi-layer film on the inclined surface RS of the light guiding member 21. A reflectance of the half mirror layer 28 with respect to the image light GL is set to 10% to 50% within an assumed angle of incidence range of the image light GL, from an aspect of making the observation of external light easy via a see-through. The reflectance of the half mirror layer 28 with respect to the image light GL in a specific example is set to, for example, 20%, and the transmittance with respect to the image light is set to, for example, 80%.

Figure 3D:
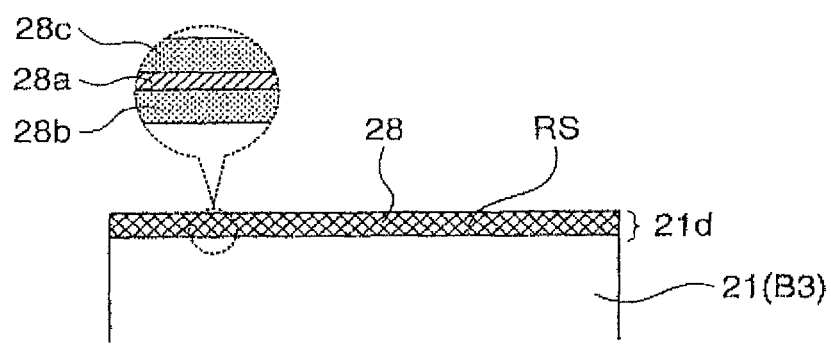
FIG. 3D is a diagram illustrating a structure of a fourth reflective surface in a light emission portion of the light guiding member.

FIG. 3D shows a diagram illustrating a structure of the fourth reflective surface 21*d* and the periphery thereof, and which is accompanied by an enlarged diagram of a cross-section of the half mirror layer (light-transmitting reflective film or semi-transmissive reflective film) 28. As is clear from the drawing, the half mirror layer (reflective film) 28 includes a metallic reflective film 28*a* not having a polarization characteristic, a first dielectric multi-layer film 28*b* having the polarization characteristic, and a second dielectric multi-layer film 28*c* having the polarization characteristic. Here, the metallic reflective film 28*a* is interposed between the first dielectric multi-layer film 28*b* and the second dielectric multi-layer film 28*c*. That is, the half mirror layer 28 has a sandwich structure in which the metallic reflective film 28*a* is disposed at the center. The metallic reflective film 28*a* is formed of, for example, Ag film, Al film, or the like. In a case where the metallic reflective film 28*a* is formed of the Ag film, absorption is small, and a loss caused by the half mirror layer 28 is suppressed, such that efficiency may be increased. In addition, the Ag film has lower sensitivity of transmittance with respect an increase or a decrease in a film thickness compared to the case of the Al film or the like, such that it is easy to adjust the reflectance or the transmittance of the half mirror layer 28. The lower-side first dielectric multi-layer film 28*b* or the upper-side second dielectric multi-layer film 28*c* is formed by laminating several layers or more of transparent dielectric layers. That is, both the dielectric multi-layer films 28*b* and 28*c* are formed by laminating materials of plural kinds of refraction indexes through a vapor deposition, and are made to have an angle of incidence dependency with respect to the reflectance or the transmittance through an interference action. As a high refraction index material making up these dielectric multi-laver films 28*b* and 28*c*, liar example, a light transmitting material such as $SiO_2$ and MgF may be exemplified. In addition, as a middle refraction index material making up these dielectric multi-layer films 28*b* and 28*c*, a light transmitting material such as $TiO_2$, $Ta_2O_5$, and $ZrO_2$ may be exemplified. As a low refraction index material making up these dielectric multi-layer films 28*b* and 28*c*, a light transmitting material such as $Al_2O_3$ may be exemplified.

Figure 4:
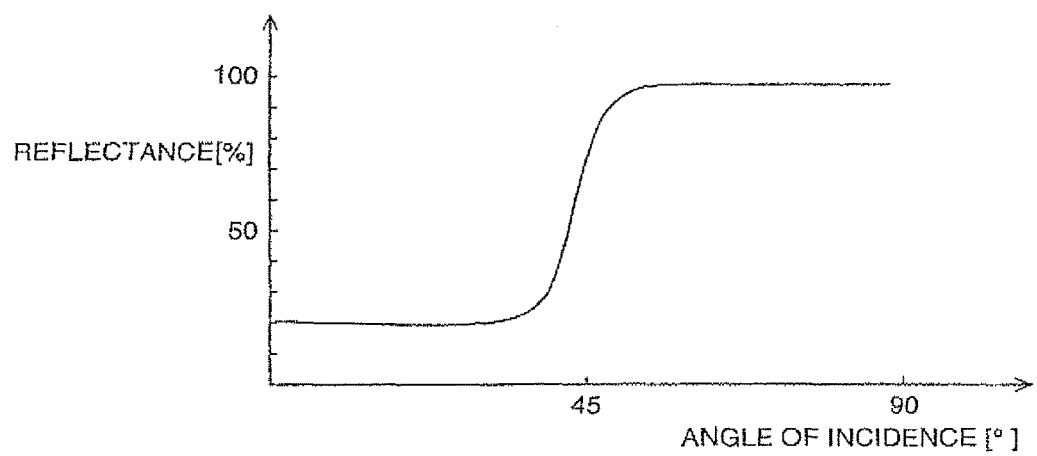
FIG. 4 is a graph illustrating a reflectance characteristic of a half mirror layer.
Figure 5:
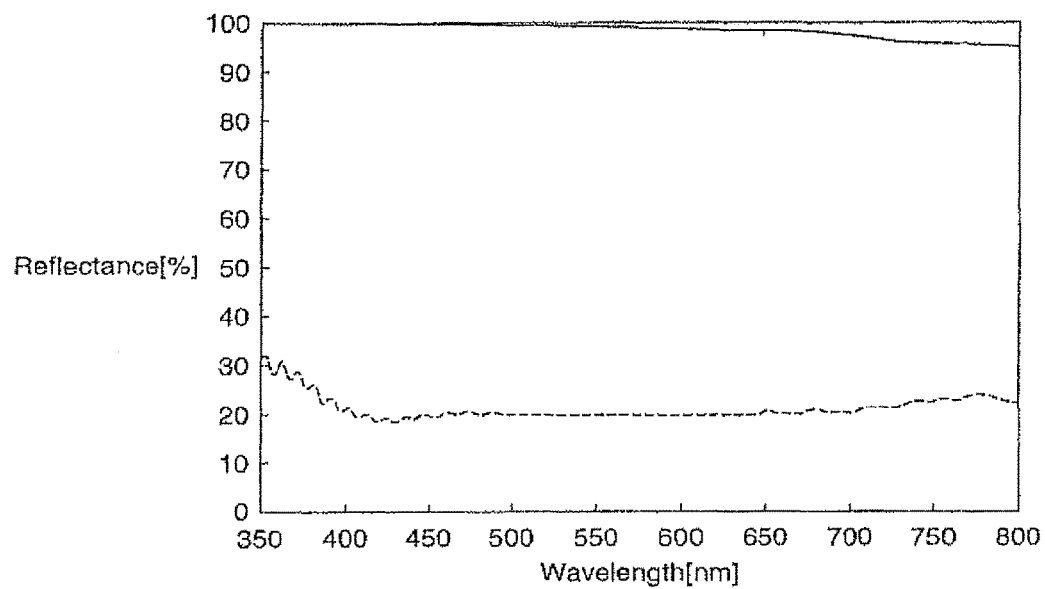
FIG. 5 is a graph illustrating a wavelength dependency of the reflectance at a different angle of incidence.

FIG. 4 shows a graph illustrating a reflectance characteristic of the half mirror layer (reflective film) 28. Here, the horizontal axis represents an angle of incidence of light to the half mirror layer 28 and the vertical axis represents a reflectance. FIG. 5 shows a graph illustrating a wavelength dependency of a reflectance of light beams that are incident to the half mirror layer 28 at angle 25° to 70°. Here, the horizontal axis represents a wavelength of light that is incident to the half mirror layer 28 and the vertical axis represents a reflectance. In FIG. 5, a reflectance at the angle of incidence of 25° is indicated by a dotted line, and a reflectance at the angle of incidence of 70° is indicated by a solid line.

As is clear from the above-described graphs, light that is incident to the half mirror layer 28 at an angle of incidence that is equal to or less than a reference angle or a lower limit angle set to substantially 40° is reflected with a reflectance of substantially 20%, and light that is incident to the half mirror layer 28 at an angle of incidence that is larger than the lower limit angle is reflected with a reflectance that increases drastically from 20% accompanying the increase in the angle of incidence, and is almost reflected with a reflectance of substantially 100% at an angle of 50° or more. Here, the lower limit angle corresponds to the upper limit of an angle of incidence range of 10° to 40° that is assumed in relation to the image light GL that is incident to the half mirror layer 28, and prevents light beams with a large angle of incidence other than the image light GL, specifically, ghost light from being incident to the eye EY. It will be described later in detail with respect to the removing of the ghost light, but the angle of incidence at the rear side of the half mirror layer 26 is generally set to 60° or more.

In addition, a reflectance of the half mirror layer 28 with respect to the image light GL that is incident to the half mirror layer 28 at an angle that is equal to or less than the lower limit angle is not limited to 20% and may be appropriately changed according to use. In addition, in relation to the reflectance of the half mirror layer 28 with respect to the image light GL that is incident to the half mirror layer 28 at an angle that is equal to or less than the lower limit angle, it is preferable that dependency with respect to an angle or a wavelength be small, and strictly, it is not necessary to be uniform.

Figure 2B:
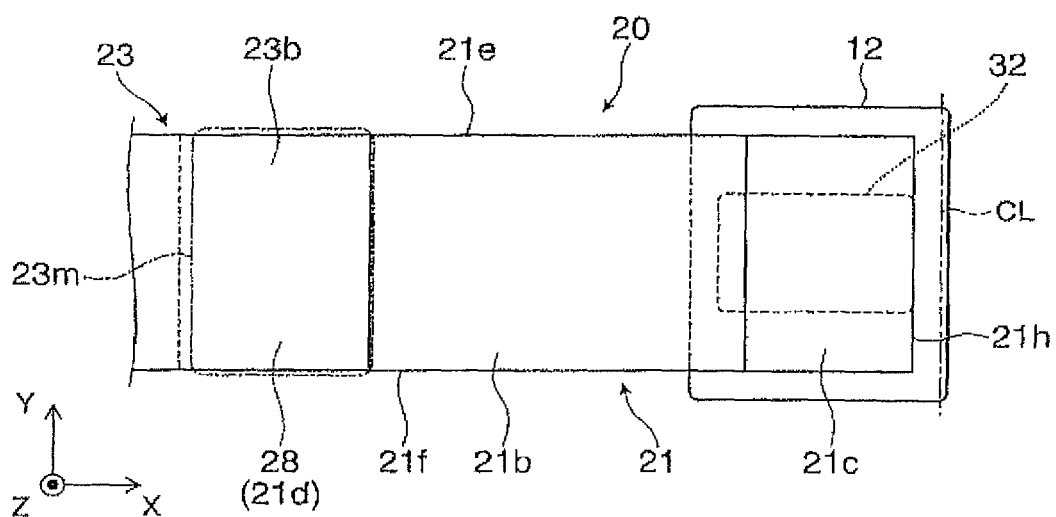
FIG. 2B is a front elevation view of the main body portion.

Returning to FIG. 2B or the like, the fourth reflective surface 21d is inclined, for example, at an acute angle α of 25° to 27° with respect to the second optical axis AX2 or XY plane that is orthogonal to the first reflective surface 21a, and the image light GL, which is incident through the first and second reflective surfaces 21a and 21b of the light guiding portion B2, is partially reflected by the half mirror layer 28 and is made to turn back to face the negative Z-direction as a whole, and thereby the image light GL passes through the light emission surface OS. In addition, the image light GL that is transmitted through the fourth reflective surface 21d is incident to the light transmitting member 23 and is not used for forming a video.

The light transmitting member 23 has the same refractive index as a main body of the light guiding member 21, and has a first surface 23a, a second surface 23b, and a third surface 23c. The first and second surfaces 23a and 23b extend along the XY plane. In addition, the third surface 23c is inclined with respect to the XY plane, and is disposed to be opposite to the fourth reflective surface 21d of the light guiding member 21 and in parallel therewith. That is, the light transmitting member 23 is a member having a wedge-shaped portion that is interposed between the second surface 23b and the third surface 23c. The light transmitting member 23 is formed of a resin material showing a high light transmitting property at a visible range similarly to the light guiding member 21. The light transmitting member 23 is a member of a block state, which is integrally molded by an injection molding, and is formed, for example, by injecting a thermal polymerization-type resin material into a metal mold and by thermally curing this molded resin material.

In the light transmitting member 23, the first surface 23a is disposed on an extended plane of the first reflective surface 21a provided to the light guiding member 21 and is located at a rear side close to the observer's eye EY, and the second surface 23b is disposed on an extended plane of the second reflective surface 21b provided to the light guiding member 21 and is located at a front side distant from the observer's eye EY. The third surface 23c is a rectangular transmissive surface that is bonded to the fourth reflective surface 21d of the light guiding member 21 by an adhesive. An angle made by the first surface 23a and the third surface 23c is the same as an angle ε made by the second reflective surface 21b and the fourth reflective surface 21d of the light guiding member 21, and an angle made by the second surface 23b and the third surface 23c is the same as an angle β made by the first reflective surface 21a and the third reflective surface 21c of the light guiding member 21.

The light transmitting member 23 and the light guiding member 21 make up a see-through portion B4 corresponding to a portion opposite to the observer's eye at a bonding portion of these members and in the vicinity of the bonding portion. A wedge-shaped member 23m, which is interposed between the second surface 23b and the third surface 23c making an acute angel in the light transmitting member 23 and extends in the negative X-direction, is bonded to the wedge-shaped light emission portion B3 and thereby makes up a central portion in the X-direction in the plate-shaped see-through portion B4. A reflective coat such as a mirror layer is not provided to the first and second surfaces 23a and 23b, such that these suffices transmit the external light GL' with a high transmittance similarly to the light guiding portion B2 of the light guiding member 21. The third surface 23c may also transmits the external light GL' with a high transmittance, but the fourth reflective surface 21d of the light guiding member 21 is provided with the half mirror layer 28, such that the external light GL' after passing through the third surface 23c is reduced, for example, by 20%. That is, an observer observes light in which the image light GL reduced to 20% and the external light GL' reduced to 80% overlap with each other.

C. Outline of Optical Path of Image Light

Figure 6A:
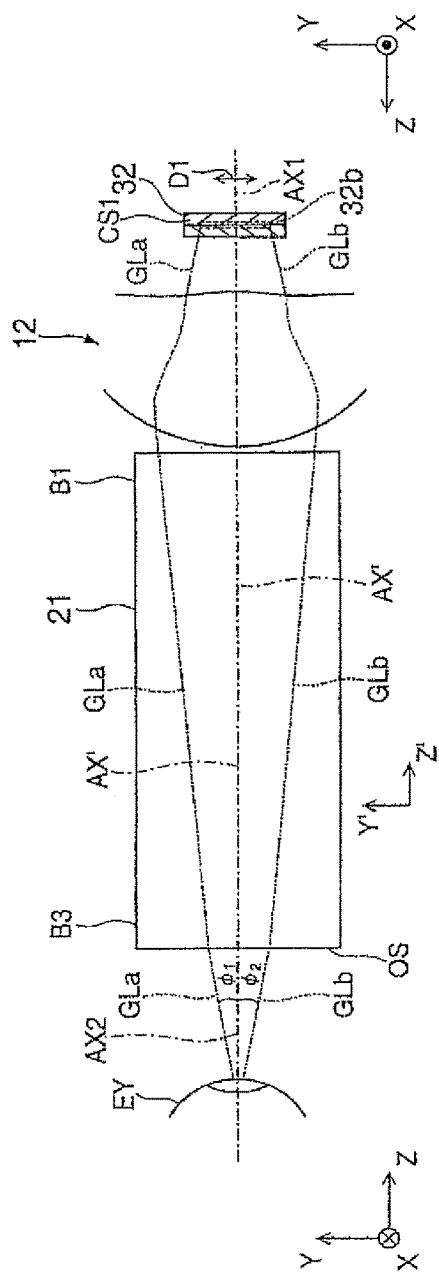
FIG. 6A is a conception diagram in which an optical path in relation to a first vertical direction is developed.

FIG. 6A shows a diagram illustrating an optical path in the first direction D1 corresponding to a vertical cross-section CS1 of the liquid crystal display device 32. In the vertical cross-section along the first direction D1, that is, a YZ plane (a Y'Z' plane after being developed), in the image light emitted from the liquid crystal display device 32, a component, which is emitted from an upper end side (a positive Y side) of a display region 32b, indicated by a one-dotted line in the drawing is set as image light GLa, and a component, which is emitted from a lower end side (a negative Y side) of a display region 32b, indicated by a two-dotted line in the drawing is set as image light GLb.

The upper-side image light GLa is converted into a parallel light beam by the projective optical system 12, passes through the light incidence portion B1, the light guiding portion B2, and the light emission portion B3 of the light guiding member 21 along the developed optical axis AX', and is incident to the observer's eye EY from an upper-side direction inclined at an angle of $\phi_1$, in a parallel light beam state with respect to the observer's eye EY. On the other hand, the lower-side image light GLb is converted into a parallel light beam by the projective optical system 12, passes through the light incidence portion B1, the light guiding portion B2, and the light emission portion B3 of the light guiding member 21 along the developed optical axis AX', and is incident to the observer's eye EY from a lower side direction inclined at an angle of $\phi_2 (|\phi_2|=|\phi_1|)$ in a parallel light beam state with respect to the observer's eye EY. The angles $\phi_1$ and $\phi_2$ correspond to an upper half angle of view and a lower half angle of view, respectively, and. are set to, for example, 6.5°.

Figure 6B:
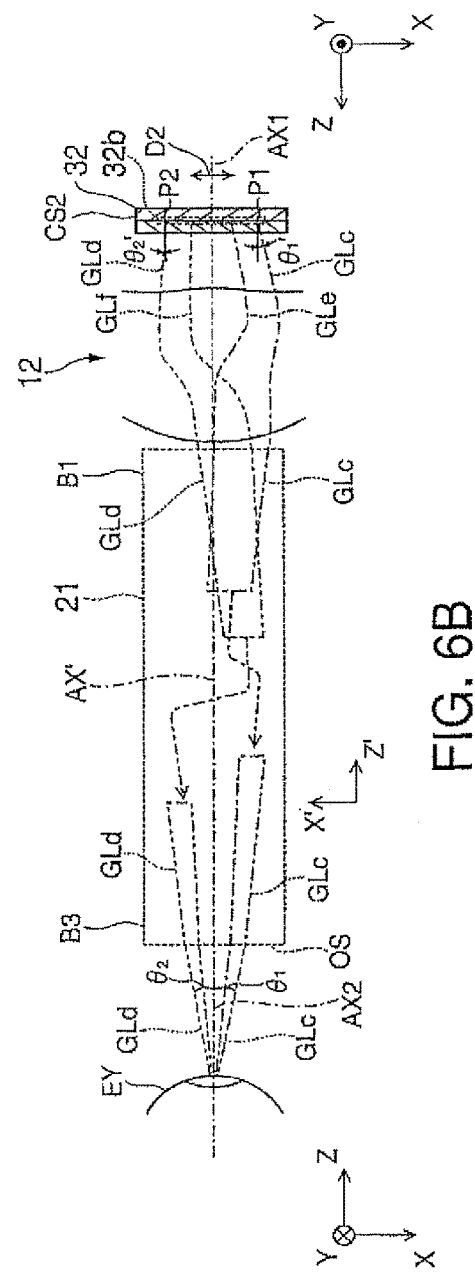
FIG. 6B is a conception diagram in which an optical path in relation to a second horizontal direction is developed.

FIG. 6B shows a diagram illustrating an optical path in the second direction (confinement direction or composite direction) D2 corresponding to a horizontal cross-section CS2 of the liquid crystal display device 32. In the horizontal cross section along the second direction (confinement direction or composite direction) D2, that is, a XZ plane (a X'Z' plane after being developed), in the image light emitted from the liquid crystal display device 32, a component, which is emitted from a first display point P1 of a right end side (a positive X side) toward the display region 32b, indicated by a one-dotted line in the drawing is set as image light GLc, and a component, which is emitted from a second display point P2 of a left end side (a negative X side) toward the display region 32b, indicated by a two-dotted line in the drawing is set as image light GLd. In FIG. 6B, image light GLe emitted from a right inner side and image light GLf emitted from a left inner side are added for reference.

The image light GLc from the right-side first display point P1 is converted into a parallel light beam by the projective optical system 12, passes through the light incidence portion B1, the light guiding portion B2, and the light emission portion B3 of the light guiding member 21 along the developed optical axis AX', and is incident to the observer's eye EY from a right side direction inclined at an angle of $\theta_1$, in a parallel light beam state with respect to the observer's eye EY. On the other hand, the image light GLd from the left-side second display point P2 is converted into a parallel light beam by the projective optical system 12, passes through the light incidence portion B1, the light guiding portion B2, and the light emission portion B3 of the light guiding member 21 along the developed optical axis AX', and is incident to the observer's eye EY from a left-side direction inclined at an angle of $\theta_2 (|\theta_2|=|\theta_1|)$ in a parallel light beam state with respect to the observer's eye EY. The angles $\theta_1$ and $\theta_2$ correspond to a left half angle of view and a right half angle of view, respectively, and are set to, for example, 10°.

In addition, in regard to the horizontal direction, that is, the second direction D2, the image light beams GLc and GLd are turned back by reflection inside the light guiding member 21 and the number of times of reflection of the image light beams GLc and GLd is different in each case, such that each of the image light beams GLc and GLd is discontinuously expressed in the light guiding member 21. In addition, in regard to the observer's eye EY, a viewing direction is vertically inverted compared to the case of FIG. 2A. Consequently, in regard to the horizontal direction, a screen is horizontally inverted as a whole, but as described later in detail, when the light guiding member 21 is processed with high accuracy, a right half image of the liquid crystal display device 32 and a left half image of the liquid crystal display device 32 are continuously combined without deviation. In addition, in consideration of the difference in the number of times of reflection of the image light beams GLc and GLd inside the light guiding member 21, the angle of emission $\theta_1'$ of the right-side image light GLc and the angle of emission $\theta_2'$ of the left-side image light GLd are made to be different from each other.

As described above, the image light beams GLa, GLb, GLc and GLd that are incident to the observer's eye EY become virtual images from infinite distance, such that in regard to the first vertical direction D1, a video formed on the liquid crystal display device 32 is erected, and in regard to the second horizontal direction D2, a video formed on the liquid crystal display device 32 is inversed.

D. Optical Path of Image Light in Relation to Horizontal Direction

Figure 7:
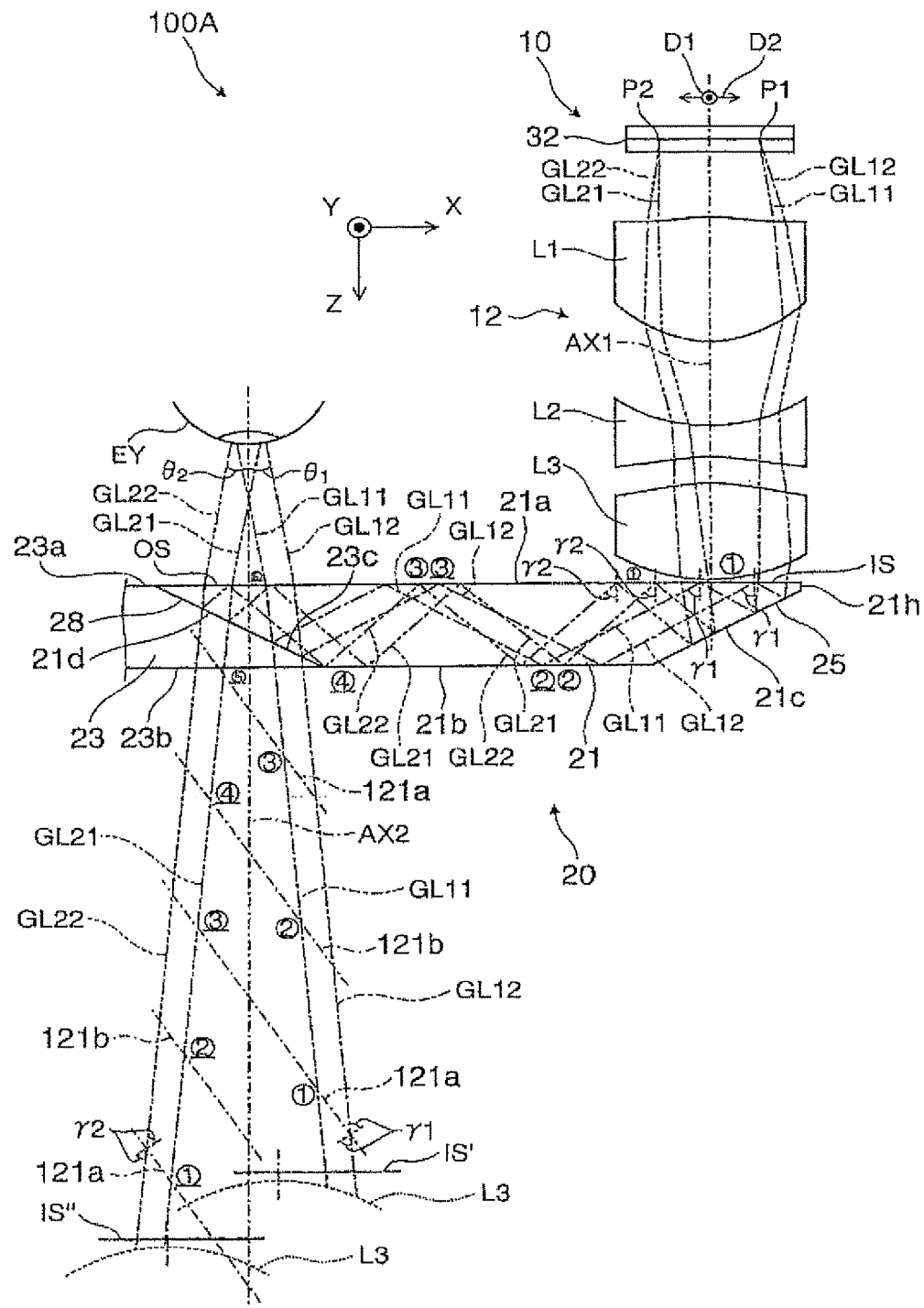
FIG. 7 is a plan view specifically illustrating an optical path in an optical system of a virtual display device.

FIG. 7 shows a cross-sectional view illustrating a specific optical path in the first display device 100A. The protective optical system 12 includes three lenses L1, L2, and L3.

When passing through the lenses L1, L2, and L3 of the projective optical system 12, image light beams GL11 and GL12 from the right-side first display point P1 of the liquid crystal display device 32 are converted into parallel light beams, and are incident to the light incidence surface IS of the light guiding member 21. The image light beams GL11 and GL12 guided to the inside of the light guiding member 21 repeat a total reflection on the first and second reflective surfaces 21a and 21b at the same angle, and are eventually emitted from the light emission surface OS as a parallel light beam. Specifically, the image light beams GL11 and GL12 are reflected by the third reflective surface 21c of the light guiding member 21 as a parallel light beam, and then are incident to the first reflective surface 21a of the light guiding member 21 at a first reflection angle γ1 and are totally reflected (total reflection of a first time). Then, the image light beams GL11 and GL12 are incident to the second reflective surface 21b while maintaining the first reflection angle γ1 and are totally reflected (total reflection of a second time), and then are incident to the first reflective surface 21a again and are totally reflected (total reflection of a third time). As a result, the image light beams GL11 and GL12 repeat the total reflection on the first and second reflective surfaces 21a and 21b while maintaining the first reflection angle γ1. The image light beams GL11 and GL12 are totally reflected by the first and second reflective surfaces 21a and 21b three times in total, and are incident to the fourth reflective surface 21d. The image light beams GL11 and GL12 are reflected by the fourth reflective surface 21d at the same angle as the third reflective surface 21c and are emitted from the light emission surface OS as a parallel light beam at an inclination of an angle $\theta_1$ with respect to the second optical axis AX2 direction that is orthogonal to the light emission surface OS.

When passing through the lenses L1, L2, and L3 of the projective optical system 12, image light beams GL21 and GL22 from the left-side second display point P2 of the liquid crystal display device 32 are converted into parallel light beams, and are incident to the light incidence surface IS of the light guiding member 21. The image light beams GL21 and GL22 guided to the inside of the light guiding member 21 repeat a total reflection on the first and second reflective surfaces 21a and 21b at the same angle, and are eventually emitted from the light emission surface OS as a parallel light beam. Specifically, the image light beams GL21 and GL22 are reflected. by the third reflective surface 21c of the light guiding member 21 as a parallel light beam, and then are incident to the first reflective surface 21a of the light guiding member 21 at a second reflection angle γ2 (γ2<γ1) and are totally reflected (total reflection of a first time). Then, the image light beams GL21 and GL22 are incident to the second reflective surface 21b while maintaining the second reflection angle γ2 and are totally reflected (total reflection of a second time), are incident again to the first reflective surface 21a and are totally reflected (total reflection of a third time), are incident again to the second reflective surface 21b and are totally reflected (total reflection of a fourth time), and are incident again to the first reflective surface 21a and are totally reflected (total reflection of a fifth time). As a result, the image light beams GL21 and GL22 are totally reflected by the first and second reflective surfaces 21a and 21b five times in total and are incident to the fourth reflective surface 21d. The image light beams GL21 and GL22 are reflected by the fourth reflective surface 21d at the same angle as the third reflective surface 21c and are emitted from the light emission surface OS as a parallel light beam at an inclination of an angle $\theta_2$ with respect to the second optical axis AX2 direction that is orthogonal to the light emission surface OS.

In FIG. 7, a first virtual surface 121*a* corresponding to the first reflective surface 21*a* in a case where the light guiding member 21 is developed, and a second virtual surface 121*b* corresponding to the second reflective surface 21*b* in a case where the light guiding member 21 is developed are illustrated. Through such a development, it can be seen that the image light beams GL11 and GL12 from the first display point P1 pass through an incident equivalent surface IS' corresponding to the light incidence surface IS, pass through the first surface 121*a* two times, pass through the second surface 121*b* one times, are emitted from the light emission surface OS. and are incident to the observer's eye EY, in addition, it can be seen that the image light beams GL21 and GL22 from the second display point P2 pass through an incidence equivalent surface IS" corresponding to the light incidence surface IS, pass through the first surface 121*a* three times, pass through the second surface 121*b* two times, are emitted from the light emission surface OS, and are incident to the observer's eye EY. In other words, the observer observes the lens L3 of the projective optical system 12 that is present in the vicinity of the two incidence equivalent surfaces IS' and IS" that are present at positions different from each other in an overlapped manner.

Figure 8A:
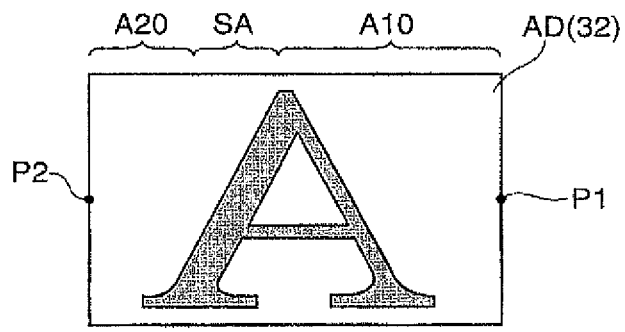
FIG. 8A is a diagram illustrating a display surface of a liquid crystal display device.
Figure 8B:
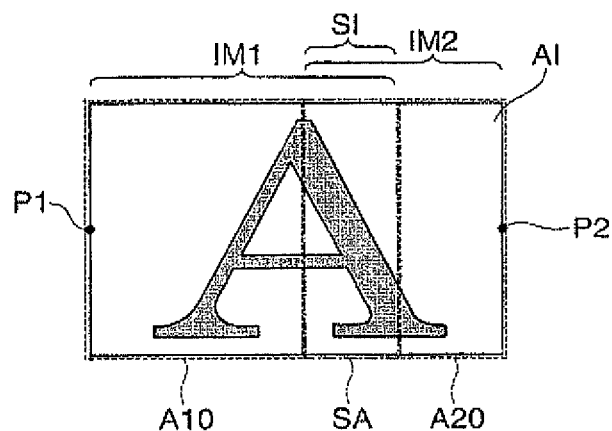
FIG. 8B is a diagram illustrating a conception of a virtual image of the liquid crystal display device, which is viewed by an observer.
Figure 8C:
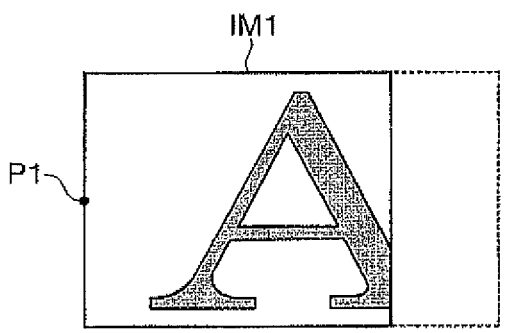
FIGS. 8C and 8D are diagrams illustrating two partial images making up the virtual image.
Figure 8D:
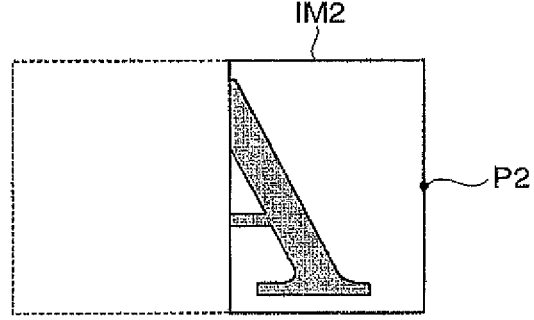

FIG. 8A shows a diagram illustrating a conception of a display surface of a liquid crystal display device 32, FIG. 8B is a diagram illustrating a conception of a virtual image of the liquid crystal display device 32, which is viewed to an observer, and FIGS. 8C and 8D are diagrams illustrating partial images making up the virtual image. A rectangular image forming region AD provided to the liquid crystal display device 32 shown in FIG. 8A is observed as a virtual image display region AI shown in FIG. 8B. A first projection image IM1 corresponding to a portion ranging from center to right-side in the image forming region AD of the liquid crystal display device 32 is formed at a left side of the virtual image display region AI, and this first projection image IM1 becomes a partial image in which a right-side is deficient as shown in FIG. 8C. In addition, a second projection image IM2 corresponding to a portion ranging from center to left-side in the image forming region AD of the liquid crystal display device 32 is formed as a virtual image at a right side of the virtual image display region AI, and this second projection image IM2 becomes a partial image in which a left half is deficient as shown in FIG. 8D.

A first partial region A10, which forms only the first projection image (virtual image) IM1 in the liquid crystal display device 32 shown in FIG. 8A, includes, for example, the first display point P1 of the right end of the liquid crystal display device 32 and emits the image light beams GL11 and GL12 that are totally reflected in the light guiding portion B2 of the light guiding member 21 three times in total. A second partial region A20, which fibrin s only the second projection image (virtual image) IM2 in the liquid crystal display device 32, includes, for example, the second display point P2 of the left end of the liquid crystal display device 32 and emits the image light beams GL21 and GL22 that are totally reflected in the light guiding portion B2 of the light guiding member 21 five times in total. Image light from a band SA near the center of the image forming region AD of the liquid crystal display device 32, which is interposed between the first and second partial regions A10 and A20 and extends vertically, forms a superimposed image SI shown in FIG. 8B. That is, image light from the band SA of the liquid crystal display device 32 includes the first projection image IM1 formed by the image light beams GL11 and GL12 that are totally reflected in the light guiding portion B2 three times in total, and the second projection image IM2 formed by the image light beams GL21 and GL22 that are totally reflected in the light guiding portion B2 five times in total, and these first and second projection image IM1 and IM2 overlap with each other on the virtual image display region AI. When the light guiding member 21 is accurately processed, and thereby a light beam that is accurately collimated by the projective optical system 12 is formed, it is possible to prevent deviation or bleeding due to overlapping of the two projection images IM1 and IM2 with respect to the superimposed image IS. In addition, a horizontal width or an overlapping width of the band SA where the overlapping occurs may be adjusted by controlling an angle range of the illumination light SL that illuminates the liquid crystal display device 32. In this embodiment, the angle range of the illumination light SL is not particularly adjusted, such that the band SA of the horizontal width or the overlapping width that corresponds to a divergence characteristic of the backlight light-guiding portion 31*b* or the like is present.

Hereinbefore, the number of times of total reflection of the image light beams GL11 and GL12 emitted from the first partial region A10 including the first display point P1 of the right-side of the liquid crystal display device 32 by the first and second reflective surfaces 21*a* and 21*b* is set to three times in total, and the number of times of total reflection of the image light beams GL21 and 22 emitted from the second partial region A20 including the second display point P2 of the left-side of the liquid crystal display device 32 by the first and second reflective surfaces 21*a* and 21*b* is set to five times in total, but the number of times of total reflection may be appropriately changed. That is, through an adjustment of external form (that is, the thickness t, the distance D, and acute angles α and β) of the light guiding member 21, the number of times of total reflection of the image light beams GL11 and GL12 may be set to five times in total, and the number of times of total reflection of the image light beams GL21 and GL22 may be set to seven times in total. In addition, hereinbefore, the number of times of total reflection of the image light beams GL11, GL12, GL21, and GL22 is an odd number, but when the light incidence surface IS and the light emission surface OS are disposed at an opposite side, that is, the light guiding member 21 is made to have a parallelogram shape in a plan view, the number of times of total reflection of the image light beams GL11, GL12, GL21, and GL22 becomes an even number.

Processing of Ghost Light

Figure 9:
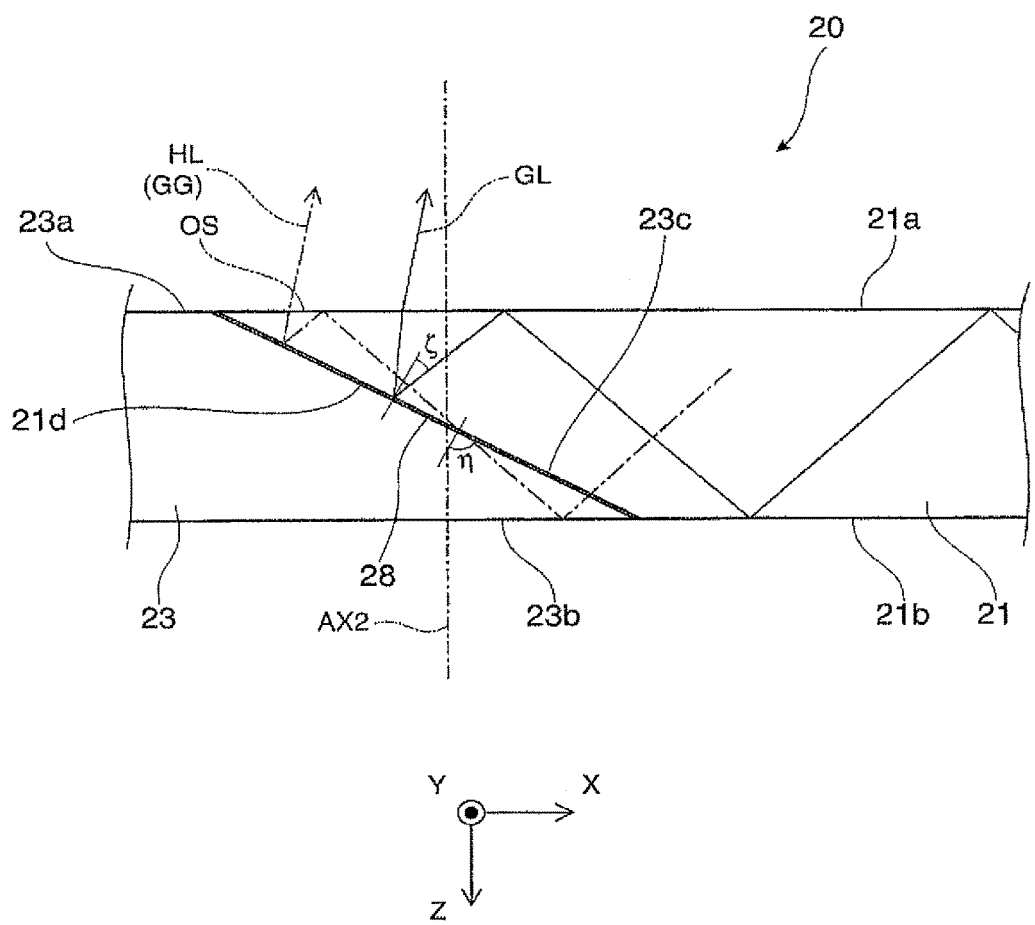
FIG. 9 is an enlarged diagram illustrating a processing of ghost light in a light guiding device.

FIG. 9 shows an enlarged diagram illustrating a processing of ghost light in a light guiding device 20. In regard to the light emission portion B3 of the light guiding member 21, the image light GL that is incident after passing through the first and second reflective surfaces 21*a* and 21*b* is reflected by the fourth reflective surface 21*d* and passes through the light emission surface OS. At this time, the fourth reflective surface 21*d* serves as a half mirror, such that the image light GL passes through the fourth reflective surface 21*d* with intensity of, for example, substantially 80% and may become ghost light GG. That is, the image light GL passed through the fourth reflective surface 21*d* is reflected by the second surface 23*b*, but in a case where this image light GL passes through the fourth reflective surface 21*d*, this image light GL may pass through the first reflective surface 21*a* or the fourth reflective surface 21*d* and thereby may become the ghost light GG that is relatively conspicuous. In this embodiment, this ghost light GG is blocked by a half mirror layer (light-transmitting reflective film or semi-transmissive reflective film) 28 having an angle characteristic.

In addition, the ghost light GG caused by the image light GL that passes through the fourth reflective surface 21d may occur because it is not easy to form the second surface 23b to be strictly parallel with respect to the second reflective surface 21b due to bonding accuracy or the like, or the like. More specifically, the second reflective surface 21b of the light guiding member 21 and the second surface 23b of the light transmitting member 23 are disposed to be substantially flush with each other, but strictly, these are not disposed to be flush with each other. That is, in a case where it is tried to dispose the second reflective surface 21a and the second surface 23b to be strictly flush with each other, the cost increases extremely. On the other hand, when the second reflective surface 21a and the second surface 23b are disposed to be substantially flush with each other, it is not difficult to observe the outside through the see-through portion B4. Therefore, in relation to a parallelism between the second reflective surface 21a of the light guiding member 21 and the second surface 23b of the light transmitting member 23, it is preferable that stringency be mitigated to promote the easiness of production or the cost reduction. However, according to a review by the present inventors, they found that even when the second surface 23b of the light transmitting member 23 is inclined at a minuscule angle (for example, several minutes of arc) with respect to the second reflective surface 21a of the light guiding member 21, the ghost light GO may be observed to the eye EY. That is, there is no problem when the second reflective surface 21a and the second surface 23b are strictly parallel with each other, but when the second reflective surface 21a and the second surface 23b make the minuscule angle, there is a concern. that unnecessary light HL, which passes through the fourth reflective surface 21d, is reflected by the second surface 23b, and passes again through the fourth reflective surface 21d, may pass through the light emission portion B3 at the same angle condition as the image light GL and may be incident to the eye EY. Thus unnecessary light HL is not strictly parallel with the image light GL due to the minuscule angle made by the second reflective surface 21a and the second surface 23b, and has a slight angle deviation with respect to the image light GL. Therefore, the unnecessary light HL may be observed as the ghost light GG, that is, a bleeding with respect to the image light GL or a double image. Hereinbefore, a case where the second surface 23b makes a minuscule angle with respect to the second reflective surface 21a is described, but processing accuracy itself of the light transmitting member 23 may have such an effect. That is, the light transmitting member 23 is acceptable as long as the see-through is excellent, and originally, substantially the same processing accuracy as the light guiding member 21 is not required. However, when the flatness of the second surface 23b is low, because of the same reason as the above there is a concern that the unnecessary light HL, which is reflected by the second surface 23b in which the flatness is low, and passes again through the fourth reflective surface 21d, may be observed as the ghost light GG.

To block such ghost light GG, it is preferable to decrease a transmittance of the ghost light GG at the fourth reflective surface 21d. Here, an angle of incidence ξ of the image light GL to the fourth reflective surface 21d may be set to an angle of incidence range 10° to 40° according to a design condition of external form of the light guiding member 21 as described above, such that the upper limit of the angle of incidence ξ may be set to substantially 40° that is equal to or larger than the lower limit angle of reflection at the half mirror layer 28. On the other hand, an angle of incidence n of the ghost light GG to the fourth reflective surface 21d. is 60° or more according to the above-described design condition of the external form of the light guiding member 21. Therefore, when angle dependency of the reflectance of the fourth reflective surface 21d is adjusted as shown in FIG. 4, the transmittance of the ghost light GG at the fourth reflective surface 21d decreases greatly, and thereby it is possible to block the incidence to the eye EY, and the image light GL is appropriately reflected to the light emission surface OS side. Accordingly, it is possible to prevent the observation of the virtual image from being hindered.

In addition, in relation to the external light, in a case where the external light has the same angle condition as the ghost light GG, the external light may be perfectly reflected by the fourth reflective surface 21d and may not be incident to the eye EY, but the external light blocked in this manner is external light from a considerably inclined direction, and there is no problem in practical use.

F. The Others

Figure 10A:
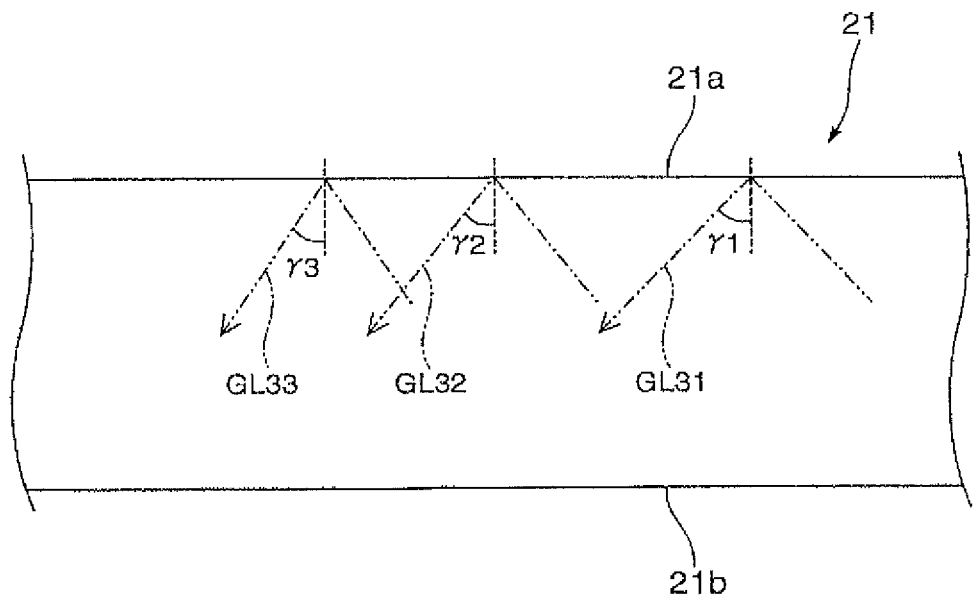
FIG. 10 is a diagram illustrating a light guiding state of image light in a modification.
FIG. 10B is a diagram illustrating a conception of a virtual image of a liquid crystal display device in the modification.
Figure 10B:
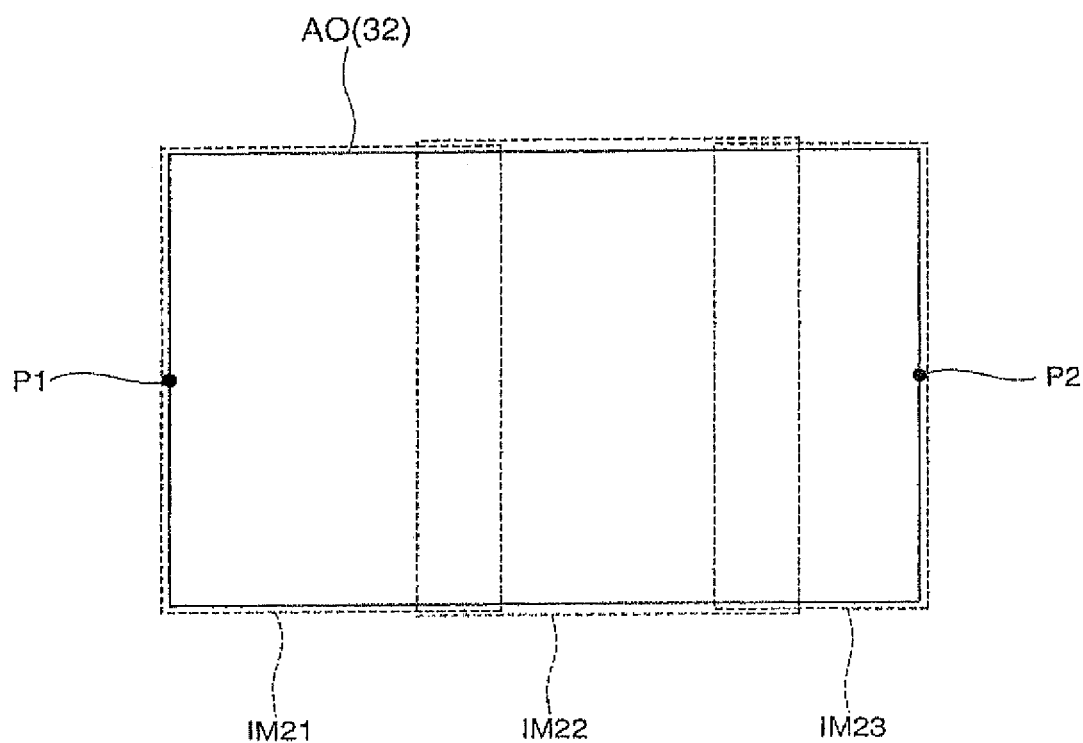

FIG. 10A shows a diagram illustrating a modification of the light guiding member 21 shown in FIG. 2A and the like. In the above description, it is described that the image light that is propagated by the light guiding member 21 is totally reflected with respect to the first and second reflective surfaces 21a and 21b at two reflection angles γ1 and γ2, but similarly to the light guiding member 21 of the modification shown in FIG. 10A, three components of image light GL31, GL32, and GL33 may be permitted to be totally reflected at reflection angles γ1, γ2, and γ3 (γ1>γ2>γ3), respectively. In this case, the image light GL emitted from the liquid crystal display device 32 is propagated in three modes, and is combined at a position of the observer's eye EY and becomes a virtual image. In this case, as shown in FIG. 10B, a projection image IM21 subjected to the total reflection, for example, three times in total is formed at a left-side of the effective display region A0, a projection image IM22 subjected to the total reflection, for example, five times in total is formed near the center of the effective display region A0, and a projection image IM23 subjected to the total reflection, for example, seven times in total is formed at a right-side of the effective display region A0.

Figure 11:
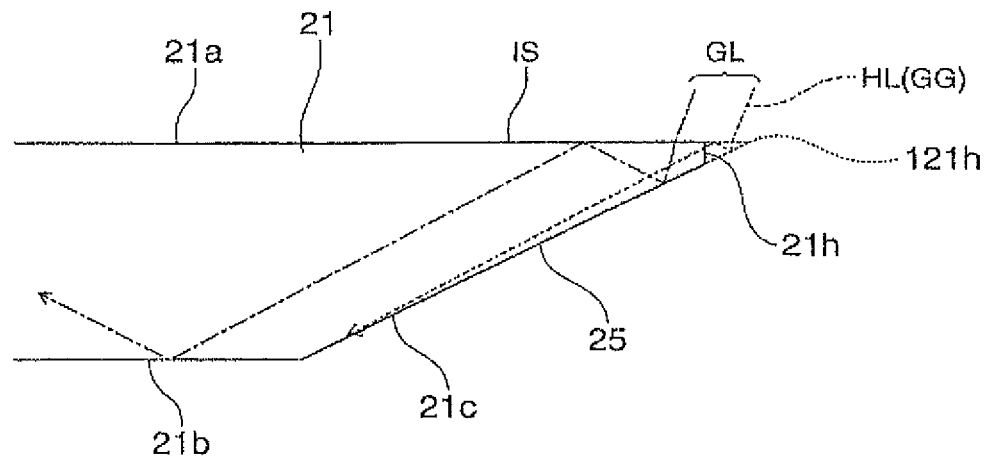
FIG. 11 is a diagram illustrating the reason why an end surface formed by removing a corner is provided to the light guiding member.

FIG. 11 shows an enlarged diagram illustrating the reason why an end surface 21h formed by removing a corner is provided to the light guiding member 21 shown in FIG. 2A or the like. The image light GL incident to a position near a corner 121h of the light guiding member 21 is reflected by the third. reflective surface 21c and then is reflected by the first reflective surface 21a, but the image light GL is reflected by the first reflective surface 21a and then is reflected again by the third reflective surface 21c. The unnecessary light HL as such re-reflected light is not parallel with the original image light GL due to the reflection at the third reflective surface 21c and is guided to an unforeseen optical path, and thereby a part thereof may be guided to the light emission portion B3 and may be emitted from the light emission surface OS. That is, the unnecessary light HL generated at the corner 121h becomes the ghost light GG that is not preferable as shown in FIG. 9, such that it is preferable to remove the unnecessary light HL in advance. Therefore, the corner 121h is removed to provide an end surface 21h that blocks stray light and thereby imposes restrictions on the optical path of the unnecessary light HL.

Figure 12:
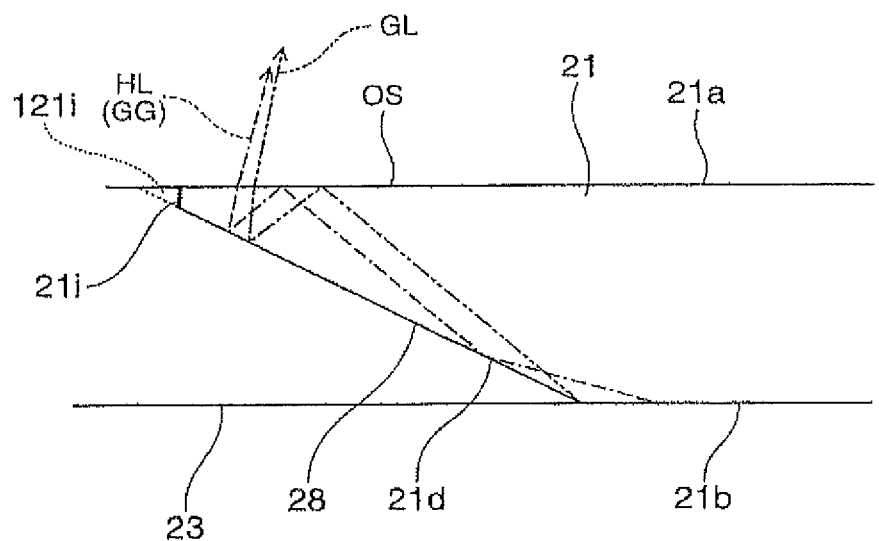

FIG. 12 shows an enlarged diagram illustrating a modification of the light guiding member 21 shown in FIG. 2A or the like. In this case, an end surface 21i, which is formed by removing a corner 121i, is provided to the fourth reflective surface 21d side of the list guiding member 21. That is, the light guiding member 21 has an external form of a polyhedral shape with eight faces. A coat or a roughened surface with, for example, a relatively high reflectance is formed on the end surface 21i, and a step difference that is fitted to the end surface 21i is also provided to the light transmitting member 23. By providing such an end surface 21i, it is possible to prevent the unnecessary light HL, which occurs in a case where the normal image light GL propagated through the light guiding member 21 is reflected by the fourth reflective surface 21d two times or more, or the unnecessary light HL, which occurs in a case where the normal image light GL passes through the light guiding portion B2 by being reflected less than three times and is reflected by the fourth reflective surface 21d, from being emitted to the outside through the light emission surface OS. That is, the end surface 21i prevents the unnecessary light HL, which is inclined with respect to the original image light GL after passing through a path other than an assumed path, from being the ghost light GG that is not preferable similarly to the case of FIG. 9.

In the above-described virtual image display device 100, the image light GL reflected by the third reflective surface 21c of the light incidence portion BI is propagated while being totally reflected by the first and second reflective surfaces 21a and 21b of the light guiding portion, and is reflected by the fourth reflective surface 21d of the light emission portion B3, and is incident to the observer's eye EY as a virtual image. At this time, the number of times of reflection of the first image light beams GL11 and GL12, which are emitted from the first partial region A10 including the first display point P1 of the image display device 11, at the light guiding portion, and the number of times of reflection of the second image light beams GL21 and GL22, which are emitted from the second partial region A20 including the second display point P2 of the image display device 11, at the light guiding portion B2, are different from each other, such that it is possible to take a wide angle width of an angle of emission of the image light GL emitted from the light emission portion B3. That is, it is possible to take in the image light GL from the different partial regions A10 and A20 in the image display device 11 at a relatively wide viewing angle, such that it is possible to secure a large display size of a virtual image that is observed over the light emission portion B3. In this way, it is configured to have a structure in which image light beams GL in which the number of times of reflection is different are taken out, such that it is possible to make the light emission portion B3 large so as to cover a pupil without making the light guiding portion B2 too much thicker, and therefore it is not necessary to perform a pupil division by making the light emission portion B3 close to the pupil. As a result, it is possible to secure a large Eyring diameter and thereby preferable see-through observation may be realized.

In addition, in the virtual image display device 100 of the embodiment, the half mirror layer 28 provided between the light emission portion B3 and the light transmitting member 23 as a reflective film has the angle dependency in which when the angle of incidence becomes larger than the angle of incidence range of the image light GL, the reflectance increases, such that it is possible to prevent unintended light, which is emitted to the light transmitting member 23 from the light guiding member 21 and is reflected inside the light transmitting member 23, from being returned to the light emission portion B3 of the light guiding member 21 after passing through the half mirror layer 28 as a reflective film at a relatively large angle of incidence. Therefore, it is possible to prevent the image light GL passed through the light transmitting member 23 from becoming ghost light GG while mitigating the demand for increasing processing accuracy of the light transmitting member 23, and bonding accuracy between the light guiding member 21 and the light transmitting member 23, and thereby it is possible to make a virtual image displayed by a virtual image display device 100 have a high quality.

Hereinbefore, the invention is described based on the embodiment, but the invention is not limited to the embodiment, and may be executed with various aspects without departing from the scope of the invention. For example, the following modifications may be made.

In the above-described embodiment, the reflectance of the half mirror layer 28 provided on the fourth reflective surface 21d of the light guiding member 21 is set to 20% and thereby priority is given to the see-through, but the reflectance of the half mirror layer 28 is set to 50% or more and thereby priority may be given to the image light. In addition, the half mirror layer 28 may not be formed on the entirety of the fourth reflective surface 21d, and may be formed at a necessary partial region. In addition, the half mirror layer 28 may be on the third surface 23c of the light transmitting member 23.

A shape of the light transmitting member 23 is not limited to a shape obtained by extending the light guiding member 21 in the horizontal direction, that is, in the X-direction, and may include a portion that is extended to vertically interpose the light guiding member 21.

In the above-described embodiment, the illumination light SL from the illumination device 31 is made not to have a particular directivity, but the illumination light SL may have a directivity according to a position of the liquid crystal display device 32. According to this configuration, it is possible to effectively illuminate the liquid crystal display device 32 and thereby it is possible to reduce a variation in brightness due to a position of the image light GL.

In the above-described embodiment, a display brightness of the liquid crystal display device 32 is not particularly adjusted, but the display brightness may be adjusted according to a range or a superimposition of the projection images IM1 and IM2 as shown in FIG. 8B.

In the above-described embodiment, the transmission-type liquid crystal display device 32 or the like is used as the image display device 11, but as the image display device 11, various devices may be used without being limited to the transmission-type liquid crystal display device 32. For example, a configuration using a reflective liquid crystal display device is possible, and a digital micro mirror device or the like may be used instead of the liquid crystal display device 32. In addition, as the image display device 11 a self-luminescent device represented by an LED array, as OLED (organic EL), or the like may be used.

The virtual image display device 100 of the above-described embodiment is configured to have a pair of image forming device 10 and light guiding device 20 in correspondence with each of a right eye and a left eye, but the virtual image display device 100 may be configured to have the image forming device 10 and the light guiding device 20 to either the right eye or the left eye to view an image with one eye.

In the above-described embodiment, the first optical axis AX1 passing through the light incidence surface IS and the second optical axis AX2 passing through the light incidence surface IS are parallel with each other, but these optical axes AX1 and AX2 may be not parallel with each other.

In the above description, the virtual image display device 100 is specifically described as a head-mounted display, but the virtual image display device 100 may be modified as a head-up display.

In the above description, in regard to the first and second reflective surfaces 21a and 21b, image light is totally reflected by an interface with air and is guided without forming a mirror, a half mirror, or the like on the surface, but the total reflection of the invention includes a reflection that occurs in a state where a mirror coat or a half mirror film is formed on the entirety of the first and second reflective surfaces 21a and 21b or a part thereof. For example, the total reflection of the invention includes a case where an angle of incidence of image light satisfies a total reflection condition, the mirror coat or the like is formed on the entirety of the first and second reflective surfaces 21a and 21b or a part thereof and thereby substantially all of the image light is reflected. In addition, as long as a sufficiently bright image light is obtained, the entirety of the first and second reflective surfaces 21a and 21b or a part thereof may be coated with a more or less transmissive mirror.

In the above description, the light guiding member 21 extends in the horizontal direction that is parallel with the eye EY, but the light guiding member 21 may extend in the vertical direction. In this case, the optical panel 110 has a parallel configuration in parallel not in series.

What is claimed is:

1. A light guiding device, comprising:
a light guiding portion;
a light incidence portion that allows image light to be incident to the light guiding portion; and
a light emission portion that emits the image light guided by the light guiding portion to the outside, and that makes the image light visible through the light emission portion;
a light transmitting member that makes up a see-through portion that allows external light to be observed through a combination with the light emission portion; and
a reflective film having a light transmitting property and an angle dependency in which when an angle of incidence becomes larger than an angle of incidence range of the image light, reflectance increases are provided between the light emission portion and the light transmitting member.

2. The light guiding device according to claim 1,
the reflective film having a characteristic in which the reflectance varies in a stepwise fashion with a predetermined lower limit angle given as a boundary, and reflects light having the angle of incidence larger than the lower limit angle and uniformly transmits light having the angle of incidence smaller than the lower limit angle.

3. The light guiding device according to claim 1,
the reflective film being formed by laminating plural kinds of films.

4. The light guiding device according to claim 3,
the reflective film having a structure in which a metallic reflective film and a dielectric multi-layer film are laminated.

5. The light guiding device according to claim 4,
the reflective film further comprising a semi-transmissive reflective film comprising an Ag film whose transmittance is adjusted as the metallic reflective film.

6. The light guiding device according to claim 1,
the reflective film having a reflectance of 10% to 50% with respect to the image light.

7. The light guiding device according to claim 1,
the light guiding portion having a first reflective surface and a second reflective surface that are disposed in parallel with each other and allow light to be guided through a substantially total reflection,
the light incidence portion having a third reflective surface that lakes a predetermined angle with respect to the first reflective surface,
the light emission portion having a fourth reflective surface that makes a predetermined angle with respect to the first reflective surface,
the light transmitting member having a wedge-shaped member having a light transmitting surface bonded to the fourth reflective surface of the light emission portion through the reflective film, and
the reflective film being disposed between the fourth reflective surface and the light transmitting surface.

8. The light guiding device according to claim 7,
the light transmitting member having a first surface and a second surface that are disposed in parallel with the first reflective surface and the second reflective surface, respectively.

9. The light guiding device according to claim 8,
the light guiding portion having an end surface that blocks ghost light at a position of at least one of portions between the first reflective surface and the fourth reflective surface, and between the first reflective surface and the third reflective surface.

10. The virtual image display device comprising:
the light guiding device according to claim 1;
an image display device that forms image light; and
a projective optical system that makes the image light emitted from the image display device be incident,
the number of times of reflection of a first image light emitted from a first partial region in the image display device in the light guiding portion, and the number of times of reflection of a second image light emitted from a second partial region different from the first partial region in regard to a confinement direction in which a return of an optical path due to reflection occurs at the time of light-guiding, in the light guiding portion, being different from each other.

11. The virtual image display device according to claim 10,
the confinement direction being a direction that is parallel with a cross-section including a first optical axis passing through the projective optical system and a normal line of the third reflective surface.

12. The light guiding device according to claim 1,
each of the light guiding device and the light transmitting member being integrally molded independently by an injection molding.

13. The light guiding device according to claim 12,
the light guiding device and the light transmitting member being molded from a thermal polymerization type resin material, respectively.

14. A light guiding device, comprising:
a light guiding portion;
a light incidence portion that allows image t to be incident to the light guiding portion;
a light emission portion that emits the image light guided by the light guiding portion to the outside, and that makes the image light visible through the light emission portion;

a light transmitting member that includes a see-through portion that allows external light to be observed through the see-through portion in combination with the light emission portion; and a semi-transmissive reflective surface configured to prevent ht incident to the light transmitting member from the light emission portion from being incident again to the light emission portion side.

15. The light guiding device according to claim 14, wherein the semi-transmissive reflective surface blocks light having an angle of incidence generally greater than 60°.

16. A light guiding device, comprising:
a light guiding portion,
a light incidence portion; and
a fight emission portion;
a light transmitting member that makes up a see-through portion; and a semi-transmissive reflective surface comprising a plurality of layers, in which a metallic reflective film is disposed adjacent to at least one dielectric multilayer film, the semi-transmissive reflective surface reflecting a plurality of image light beams having the same angle as image light beams reflected from another reflective surface, and are emitted from a surface of the light emission portion as parallel light beams at a specific inclination angle with respect to an optical axis direction that is orthogonal to the surface of the light emission portion.

17. The light guiding device according to claim 16, wherein the semi-transmissive reflective surface is formed of at least one of an Ag film and an Al film.

18. The light guiding device according to claim 16, wherein the semi-transmissive reflective surface blocks light having an angle of incidence generally greater than 60°.

* * * * *